(12) United States Patent
Brombach et al.

(10) Patent No.: US 10,293,787 B2
(45) Date of Patent: May 21, 2019

(54) VEHICLE KEY MANAGEMENT (71) Applicant: Ford Global Technologies, LLC, Dearborn, MI (US)

(72) Inventors: Ronald Patrick Brombach, Plymouth, MI (US); Daniel M. King, Northville, MI (US); Maria Eugenia Protopapas, Canton, MI (US); Maeen Mawari, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 48 days.

(21) Appl. No.: 15/674,109

(22) Filed: Aug. 10, 2017

(65) Prior Publication Data
US 2019/0047514 A1 Feb. 14, 2019

(51) Int. Cl.
*B60R 25/24* (2013.01)
*B60R 25/20* (2013.01)
*B60R 25/25* (2013.01)
*B60R 25/23* (2013.01)

(52) U.S. Cl.
CPC ........ *B60R 25/241* (2013.01); *B60R 25/2018* (2013.01); *B60R 25/23* (2013.01); *B60R 25/25* (2013.01)

(58) Field of Classification Search
CPC ... B60R 25/241; B60R 25/2018; B60R 25/23; B60R 25/25

USPC .................................................. 340/5.2–5.25
See application file for complete search history.

(56) References Cited

U.S. PATENT DOCUMENTS

| | | | |
|---|---|---|---|
| 8,578,153 B2* | 11/2013 | Johansson | H04L 9/12 713/158 |
| 8,751,105 B2 | 6/2014 | Whelan et al. | |
| 8,890,654 B2 | 11/2014 | Van Wiemeersch | |
| 9,238,450 B1 | 1/2016 | Kleve et al. | |
| 9,430,628 B2* | 8/2016 | Kim | G06K 9/00073 |
| 2008/0255720 A1* | 10/2008 | Katrak | H04L 12/66 701/32.8 |
| 2014/0129301 A1 | 5/2014 | Van Wiemeersch et al. | |
| 2016/0055699 A1 | 2/2016 | Vincenti | |
| 2016/0214571 A1 | 7/2016 | Othmer et al. | |
| 2017/0134382 A1* | 5/2017 | Darnell | H04L 63/10 |
| 2017/0301167 A1* | 10/2017 | Thooris | G07C 9/00309 |

* cited by examiner

*Primary Examiner* — Allen T Cao
(74) *Attorney, Agent, or Firm* — Brooks Kushman P.C.

(57) ABSTRACT

Systems and methods for managing keys that operate a given vehicle include a processor. Responsive to identifying a received first key for operating the vehicle as having an administrative status, the processor is configured to enable creation of a second key for operating the vehicle having the administrative status, and enable creation of a third key for operating the vehicle having a secondary status and a passcode. Responsive to receiving and identifying the third key as having the secondary status, the processor is configured to enable alteration of the passcode.

20 Claims, 7 Drawing Sheets

VEHICLE KEY MANAGEMENT

TECHNICAL FIELD

The present disclosure generally relates to systems and methods for managing keys for operating a vehicle.

BACKGROUND

A vehicle typically includes multiple keys for operating the vehicle. Issuance of new keys for the vehicle usually requires an inconvenient trip to a dealership. Moreover, when a key for the vehicle is lost or stolen, the vehicle owner risks that the missing key may be utilized for unauthorized operation of the vehicle.

SUMMARY

In an exemplary embodiment, a system includes a processor configured to, responsive to identifying a received first key for operating a vehicle as having an administrative status, enable creation of a second key for operating the vehicle having the administrative status, and creation of a third key having a secondary status and including a passcode for operating the vehicle. Responsive to receiving and identifying the third key as having the secondary status, the processor is further configured to enable alteration of the passcode.

In another exemplary embodiment, a system includes a database having a plurality of first keys and a plurality of second keys for operating a vehicle. Each of the first and second keys are assigned to a subscriber of a ride sharing service, and a vehicle feature is enabled for the first keys and not the second keys within the database. The system further includes a vehicle that is configured to, responsive to receiving one of the first keys, enable the vehicle feature.

In a further exemplary embodiment, a method includes, responsive to identifying a received first key for operating a vehicle as having an administrative status, enabling, by a processor, creation of a second key for operating the vehicle having the administrative status, and creation of a third key for operating the vehicle having a secondary status and a passcode. Responsive to receiving and identifying the third key as having the secondary status, the method further includes enabling, by the processor, alteration of the passcode.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

DETAILED DESCRIPTION

For a given vehicle, one or more keys may be issued that enable the vehicle's operation. In some cases, these one or more keys may be shared between or used by several different drivers of the vehicle, such as members of a family, or customers of a ride sharing service. Embodiments described herein relate to managing keys for a given vehicle by enabling the creation and editing of keys without necessarily requiring a trip to a dealership. Moreover, the described embodiments provide advanced key functionality options that are not offered by conventional systems and methods. In this way, the described embodiments offer enhanced and streamlined approaches to vehicle key management.

In some embodiments, a vehicle may include one or more databases that reflect keys registered to operate the vehicle. Each key may be associated with a status within the database, namely a secondary status or an administrative status, and/or may be associated with one or more vehicle feature restrictions and/or permissions within the database. The registered keys may include one or more biometrics, one or more passcodes, and one or more mobile device identifiers.

Responsive to receiving a key having the secondary status, the vehicle may provide a user with limited management options, such as an option to clear the received key from the vehicle. The vehicle may further enable operation of the vehicle subject to the vehicle restrictions and/or permissions associated with the key within the database. Responsive to receiving a key having the administrative status, the vehicle may provide the user with comprehensive management options, such as the ability to create a new key having a secondary status, to create a new key having an administrative status, and to edit existing keys having the secondary status and existing keys having the administrative status. The vehicle may also enable unrestricted operation of the vehicle responsive to receiving a key having the administrative status. In some cases, rather than presenting a key having administrative status to the vehicle, a user may provide the key to an application or website to create new keys and edit existing keys. Furthermore, should an administrative key be lost or unavailable, a user may provide an administrative login, which does not function to operate the vehicle, to an app or website and thereby enable key management.

Figure 1:
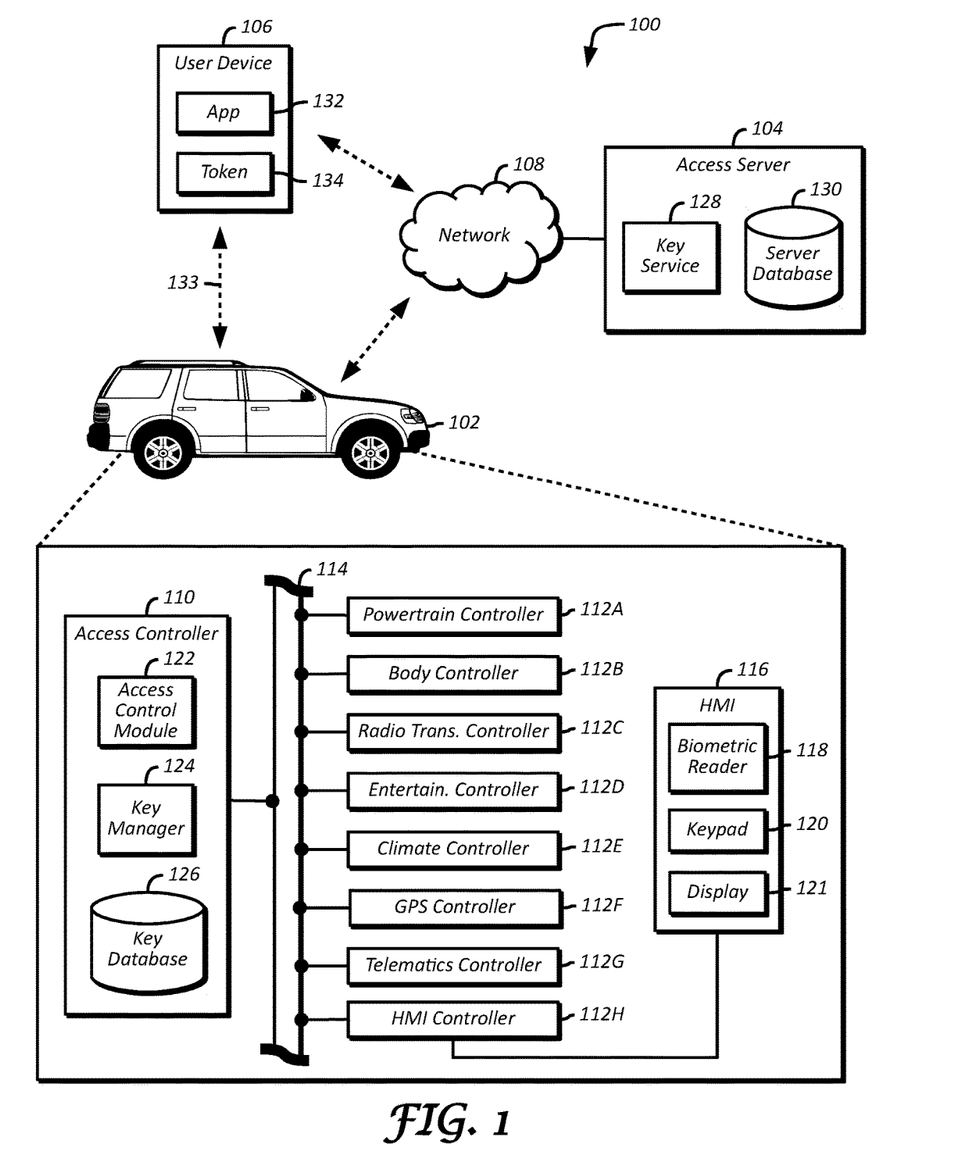
FIG. 1 is a schematic diagram of an exemplary system for managing and processing keys for a vehicle.

FIG. 1 illustrates an exemplary system 100 for managing and processing keys for a vehicle 102. The system 100 may include the vehicle 102, an access server 104, and a user device 106. Each of these system components may communicate with one another over the network 108. While an exemplary system 100 is shown in FIG. 1, the example is not intended to be limiting. Indeed, the system 100 may have more or fewer components, and alternative components and/or implementations may be used.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). The vehicle 102 may also be an autonomous vehicle (AV). As the type and configuration of the vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with and include unique identifiers, such as VINs.

The vehicle 102 may include several vehicle components, such as an access controller 110 and a plurality of other controllers 112. Each of the vehicle components may communicate with one another over one or more buses 114 to which the vehicle components are connected. The one or more buses 114 may include various methods of communication available between the controllers 112, and between the access controller 110 and the controllers 112. As some non-limiting examples, the one or more buses 114 may include one or more of a vehicle controller area network (CAN), an Ethernet network, and a media oriented system transfer (MOST) network.

The controllers 112 of the vehicle 102 may be configured to perform and manage various functions of the vehicle 102 under the power of the vehicle 102 battery and/or drivetrain. As illustrated, the controllers 112 are represented as discrete controllers 112A through 112H. However, one or more of the controllers 112 may share physical hardware, firmware, and/or software, such that the functionality from multiple controllers 112 may be integrated into a single controller 112, and/or such that the functionality of one or more controllers 112 may be distributed across a plurality of controllers 112. Similarly, the access controller 110 may be a discrete controller 110, or may share physical hardware, firmware, and/or software with one or more of the controllers 112.

As some non-limiting examples, the controllers 112 may include the following: a powertrain controller 112A, which may be configured to provide control of engine operating components (e.g., idle control components, fuel delivery components, emissions control components, etc.) and for monitoring the status of such engine operating components (e.g., status of engine codes); a body controller 112B, which may be configured to manage various power control functions such as exterior lighting, interior lighting, keyless entry, remote start, and point of access status verification (e.g., closure status of the hood, doors and/or trunk of the vehicle 102); a radio transceiver controller 112C, which may be configured to communicate with key fobs, mobile devices, or other local vehicle 102 devices; an entertainment controller 112D, which may be configured to support voice command and BLUETOOTH interfaces with the driver and driver carry-on devices; a climate controller 112E, which may be configured to provide control of heating and cooling system components (e.g., compressor clutch, blower fan, temperature sensors, etc.); and a global positioning system (GPS) controller 112F, which may be configured to provide vehicle location information.

In addition, the controllers 112 may include a telematics controller 112G configured to facilitate communication between the vehicle 102 and other devices of the system 100 over the network 108. Specifically, the telematics controller 112G may include a cellular modem, a Wi-Fi router, or other network transceiver for communicating over the network 108. The network 108 may include one or more interconnected communication networks. For example, the network 108 may include one or more of the Internet, a cable television distribution network, a satellite link network, a local area network, a wide area network, and a telephone network, as some non-limiting examples.

The controllers 112 may further include a human machine interface (HMI) controller 112H, which may be configured to facilitate occupant interaction with the vehicle 102, or more particularly with the other controllers 112 and the access controller 110. The HMI controller 112H may receive user input from and output information to an HMI 116. The HMI 116 may include input devices and controls such as a touch screen, an alphanumeric keyboard, a pointing device, keypads, pushbuttons, control knobs, and microphones capable of accepting commands or input from the user to invoke functions of the access controller 110 and the controllers 112. In an example, the HMI 116 may include steering wheel audio buttons, a push-to-talk button, instrument panel controls, and the like. The HMI 116 may also include video or alphanumeric displays, a speaker, and any other suitable audio and visual indicators capable of providing data to the user. In some cases, the HMI 116 may include a head unit display included in a center console area of the vehicle 102 cabin, and/or a screen of a gauge cluster of the vehicle 102.

The HMI 116 may include a biometric reader 118 for capturing user biometrics (e.g., a facial image, a fingerprint, a voice audio file, an eye image), and may include a keypad 120 for receiving an alphanumeric passcode. In some instances, the biometric reader 118 and the keypad 120 may include an external portion accessible from outside the vehicle 102, and an internal portion accessible from inside the vehicle 102. The external portion may be for unlocking the vehicle 102 based on a received biometric or passcode, and the internal portion may be for starting the vehicle 102 based on a received biometric or passcode.

Although represented as a discrete controller 112, the HMI controller 112H may be distributed across the other controllers 112 and/or the access controller 110. In this way, one or more the controllers 112 and/or the access controller 110 may each be connected to different components of the HMI 116, and one or more of the controllers 112 and/or the access controller 110 may be connected to a same component of the HMI 116. For example, the HMI 116 may include controls and indicators specific to operating and receiving information from the climate controller 112E, and/or may include controls and indicators specific to operating and receiving information from the body controller 112B. As another example, one or more of the controllers and/or the access controller 110 may be connected to, receive input from, and display information via a central touch screen display.

The access controller 110 may be configured to enable operation of the vehicle 102, which may include enabling access, starting, and/or driving of the vehicle 102, when a registered key is provided to the access controller 110. The access controller 110 may also be configured to enable management of the keys registered with the vehicle 102 when a registered key is provided to the vehicle 102.

The access controller 110 may include a combination of computer hardware and software components that facilitate the functions of the access controller 110. As shown in the illustrated embodiment, the access controller 110 may include an access control module 122, a key manager 124, and a key database 126. The access control module 122 may be a software application embodied by computer-executable instructions stored on a non-transitory medium of the access controller 110 that, upon execution by a processor of the access controller 110, causes the processor to receive a key presented at the vehicle 102. A key presented to the vehicle 102 may be a biometric read by the biometric reader 118, or a passcode input to the keypad 120.

As a further alternative, a key presented to the vehicle 102 may include a token 134, such as an identifier, that is wirelessly communicated to the vehicle 102 from a user device 106. The user device 106 may be configured to store the token 134 such that a user is unable to view and/or modify the token 134, and may be configured to transmit the token 134 to the vehicle 102 responsive to the user device 106 coming into local communication range of the vehicle 102. In some instances, the user device 106 may also include a keypad and/or biometric reader (not shown), and a user may cause the user device 106, via interaction with an app 132 installed thereon, to wirelessly transmit the token 134, a biometric read by the biometric reader of the user device 106, and/or a passcode entered into the keypad of the user device 106, to the vehicle 102. User devices 106 may include mobile phones, tablets, smart watches, laptop computers, and desktop computers, as some non-limiting examples.

The access controller 110 may receive data, such as keys, from the user device 106 and/or transmit data to the user device 106 over a local area connection 133, such as via a wireless transceiver (e.g., a Bluetooth transceiver, a ZIG-BEE transceiver, a Wi-Fi transceiver) installed on the vehicle 102 and configured to communicate with a complimentary transceiver on the user device 106. In some cases, the vehicle 102 transceiver may be included in or coupled to the radio transceiver controller 112C, or may be included in or coupled to the access controller 110. In another example, the access controller 110 may communicate with the user device 106 over the network 108 via the telematics controller 112G. In particular, the user device 106 may transmit a key over the network 108 directly to the vehicle 102, or instead may transmit a key over the network 108 to the access server 104, which may then forward the key to the vehicle 102.

Responsive to receiving a key, the access control module 122 may be configured to determine whether the key is registered with the vehicle 102, and also what vehicle features are associated with the key relative to the vehicle 102. To this end, the key database 126 may include one or more databases having a plurality of records, where each of the records includes a key registered for the vehicle 102, and identifies one or more vehicle features for which the registered key is disabled and/or enabled. For example, one registered key may be enabled for unlocking the vehicle 102, but not be enabled for starting and driving the vehicle 102. Another registered key may be enabled for starting and driving the vehicle 102, but not be enabled for some convenience features of the vehicle 102 (e.g., GPS). Accordingly, responsive to determining that a received key is registered with the vehicle 102, and to identifying one or more vehicle features enabled and/or disabled for the key, the access control module 122 may be configured to enable the vehicle features enabled for the key, and to disable vehicle features that are restricted or disabled for the key within the key database 126. For example, the access control module 122 may be configured to send enabling signals to controllers 112 to enable those vehicle features enabled for the key within the key database 126, and/or may be configured to send disabling control signals to the controllers 112 to disable vehicle features that are disabled for the key within the key database 126.

The key manager 124 may likewise be a software application embodied by computer-executable instructions stored on a non-transitory medium of the access controller 110 that, upon execution by a processor of the access controller 110, causes the processor to enable key management for vehicle 102. The key manager 124 may be configured to, responsive to receiving a key presented to the vehicle 102, determine whether the key has an administrative status or a secondary status. To this end, the one or more databases of the key database 126 may further include a plurality of records, where each of the records indicate a key registered for the vehicle 102, and whether the registered key has an administrative status or a secondary status. Responsive to determining that a presented key is registered and has an administrative status based on the key database 126, the key manager 124 may be configured to enable several administrative management functions, such as the creation of new administrative keys and new secondary keys, via the display 121 of the HMI 116. Alternatively, responsive to determining that a presented key is registered and has a secondary status based on the key database 126, the key manager 124 may be configured to provide limited management functions to a user, such as clearing the key, via the display 121 of the HMI 116.

As an additional method in which keys for the vehicle 102 may be managed, the access server 104, which may be geographically remote from the vehicle 102, may include a key service 128, and may include a server database 130. The key service 128 may be embodied as computer-executable instructions stored on a non-transitory medium of the access server 104 that are configured, upon execution by a processor of the access server 104, to implement functionality that is similar to or the same as the functionality of the key manager 124. The server database 130 may likewise be stored on a non-transitory computer readable medium of the access server 104, and may include a copy of the key database 126. Alternatively, rather than storing a copy of the key database 126, the key service 128 may query for and receive relevant data from the key database 126 of the vehicle 102 when needed over the network 108.

A user may manage keys registered with the vehicle 102 by accessing the app 132 installed on the user device 106. As an example, the app 132 may be a browser or key management software that enables the user device 106 to access a website or data, respectively, stored on the key service 128. Utilizing the app 32, a user may submit a key to the key service 128 of the access server 104 over the network 108. Responsive to receiving the key, the key service 128 may determine whether the key is registered for the vehicle 102, and if so, whether the key includes an administrative status or a secondary status, based on the records stored in the server database 130 or the key database 126. The key service 28 may then enable certain management functions based on the determination. The key service 28 may save any new keys or updates to the existing keys registered to the vehicle 102 in the server database 130, and/or may transmit new keys and updates to the vehicle 102 over the network 108 for inclusion in the key database 126.

In alternative embodiments, rather than interacting with the access server 104 to manage keys for the vehicle 102, the app 132 may be configured to connect and interact directly with the vehicle 102, or more particularly the key manager 124, over the network 108 or the local area connection 133. As a further alternative, the key service 128 may serve as a middle man for passing data between the user device 106 and the access controller 110, in which case the key manager 124 may function as the provider of key management functionality to the user device 106.

Figure 2:
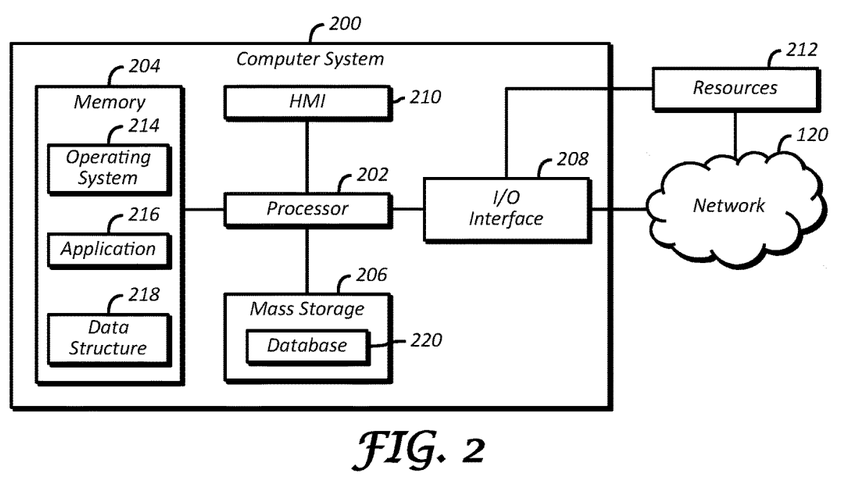
FIG. 2 is a schematic diagram of an exemplary computer system that may be included in the system of FIG. 1.

Referring to FIG. 2, the vehicle components of the vehicle 102 may be implemented by one or more computer systems, such as the exemplary computer system 200. The access server 104 and the user device 106 may likewise each be implemented by one or more computer systems.

The computer system 200 may include a processor 202, a memory 204, a mass storage memory device 206, an input/output (I/O) interface 208, and an HMI 210. The computer system 200 may also be operatively coupled to one or more external resources 212 via the network 108 or I/O interface 208. External resources may include, but are not limited to, servers, databases, mass storage devices, peripheral devices, cloud-based network services, or any other suitable computer resource that may be used by the computer system 200.

The processor 202 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 204. The memory 204 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 206 may include data storage devices such as a hard drive, optical drive, tape drive, non-volatile solid state device, or any other device capable of storing information.

The processor 202 may operate under the control of an operating system 214 that resides in the memory 204. The operating system 214 may manage computer resources so that computer program code embodied as one or more computer software applications, such as an application 216 residing in memory 204 (e.g., access control module 122, key manager 124, key service 128, app 132), may have instructions executed by the processor 202. In an alternative embodiment, the processor 202 may execute the application 216 directly, in which case the operating system 214 may be omitted. One or more data structures 218 may also reside in memory 204, and may be used by the processor 202, operating system 214, or application 216 to store or manipulate data.

The I/O interface 208 may provide a machine interface that operatively couples the processor 202 to other devices and systems, such as the network 108 or the one or more external resources 212. In an example, the one or more external resources 212 may include one or more of the controllers 112, the access server 104, and/or the user device 106. The application 216 may thereby work cooperatively with the network 108 or the external resources 212 by communicating via the I/O interface 208 to provide the various features, functions, applications, processes, or modules comprising embodiments of the invention. The application 216 may also have program code that is executed by the one or more external resources 212, or otherwise rely on functions or signals provided by other system or network components external to the computer system 200. Indeed, given the nearly endless hardware and software configurations possible, persons having ordinary skill in the art will understand that embodiments of the invention may include applications that are located externally to the computer system 200, distributed among multiple computers or other external resources 212, or provided by computing resources (hardware and software) that are provided as a service over the network 108, such as a cloud computing service.

The HMI 210 may be operatively coupled to the processor 202 of computer system 200 in a known manner to allow a user to interact directly with the computer system 26. The HMI 210 may include video or alphanumeric displays, a touch screen, a speaker, and any other suitable audio and visual indicators capable of providing data to the user. The HMI 210 may also include input devices and controls such as an alphanumeric keyboard, a pointing device, keypads, pushbuttons, control knobs, microphones, etc., capable of accepting commands or input from the user and transmitting the entered input to the processor 202. In an example, the HMI 210 may include one or more HMI components of the HMI 116.

A database 220 (e.g., key database 126, server database 130) may reside on the mass storage memory device 206, and may be used to collect and organize data used by the various systems and modules described herein. The database 220 may include data and supporting data structures that store and organize the data. In particular, the database 220 may be arranged with any database organization or structure including, but not limited to, a relational database, a hierarchical database, a network database, or combinations thereof. A database management system in the form of a computer software application executing as instructions on the processor 202 may be used to access the information or data stored in records of the database 220 in response to a query, where a query may be dynamically determined and executed by the operating system 214, other applications 216, or one or more modules.

Figure 3:
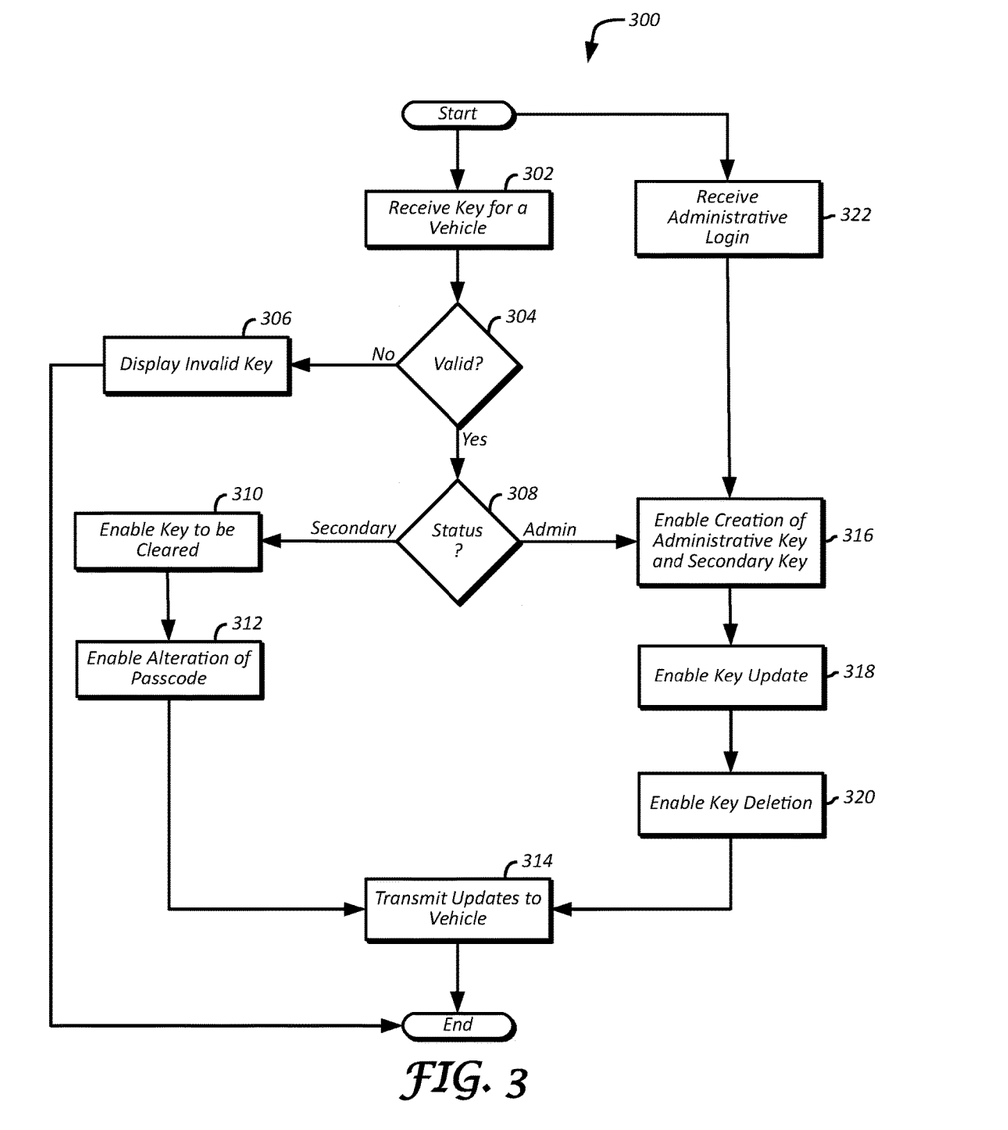
FIG. 3 is a flowchart of an exemplary process for managing keys associated with a vehicle that may be performed by the system of FIG. 1.

FIG. 3 illustrates a process 300 for managing keys that enable operation of the vehicle 102. The process 300 may be implemented by the exemplary system 100 of FIG. 1.

In block 302, a key for the vehicle 102 may be received, such as by the key manager 124 or the key service 128. The key may be in the form of a biometric, a password, or a token 134 of a user device 106. In an example, the key manager 124 may receive the key via the HMI 116 of the vehicle 102, or more particularly via the biometric reader 118 or the keypad 120 of the vehicle 102. Alternatively, the key manager 124 may receive the key from the user device 106, such as over the local area connection 133, automatically when the user device 106 enters within communication range for the local area connection 133, or when a user directs the user device 106, such as via user input to the app 132, to transmit the key over the local area connection 133. To this end, the app 132 may enable a user to enter and/or store a biometric or passcode, and thereafter transmit the key over the local area connection 133. As a further example, the key service 128 of the access server 104 may receive a key from the user device 106 over the network 108, such as via a similar interaction with the app 132, and possibly via a graphical user interface or website provided by the key service 128 and displayed on the user device 106 via the app 132.

In block 304, a determination may be made of whether the received key is valid. For example, the key manager 124 or the key service 128 may perform one or more validity checks, such as checking that the key is in a valid format. Furthermore, the key manager 124 or the key service 128 may query the key database 126 or the server database 130, respectively, to determine whether the received key is registered with the vehicle 102. Responsive to determining that the received key fails one or more validity checks ("No" branch of block 304), an "invalid key" message may be displayed in block 306, such as via the display 121 of the vehicle 102 or a display of the user device 106.

Responsive to determining that the received key is valid ("Yes" branch of block 304), in block 308, a status for the received key may be determined. In particular, the key database 126 and the server database 130 may include a plurality of records, each of the records including a key and whether the key is associated with an administrative status or a secondary status. In general, the management rights granted to a user of a registered key may depend on the status associated with the key within the key database 126 or the server database 130. Accordingly, the key manager 124 or the key service 128 may query the key database 126 or the server database 130, respectively, to identify whether the key includes an administrative status or secondary status. Once identified, a key's status may be displayed to the user, such as via the display 121 of the vehicle 102 or the display of the user device 106. In some embodiments, the server database 130 may be omitted, and the key service 128 may query the key database 126 over the network 108 to determine whether a received key is registered and, if so, to identify the key's status.

Responsive to identifying that the received key has a secondary status ("Secondary" branch of block 308), then limited management rights may be enabled for the user. In particular, the key manager 124 or key service 128 may cause a GUI to be displayed to the user that includes limited management options for the received key. The key manager 124 may cause the display 121 of the vehicle 102 to display the GUI with limited management options, and the key service 128 may cause the user device 106 to display the GUI with limited management options, such as via the app 132.

As an example of a limited management option, in block 310, the user may be given an option to clear the received key such that the key is no longer registered with the vehicle 102. In some embodiments, this option may only be available for passcode key type keys. As a further example, if the key is a passcode key type, then in block 312, the user may be given an option to alter the passcode for the received key. If the received key is being managed via the key manager 124, then the key manager 124 may store any changes made to the received key (e.g., key deletion, passcode alteration) in the key database 126, and may transmit the changes to the access server 104 over the network 108 for inclusion in the server database 130. Alternatively, if the received key is being managed via the key service 128 of the access server 104, any changes made to the received key may be transmitted to the vehicle 102 over a wireless network (e.g., network 108) for reflection in the key database 126. The changes may likewise be reflected in the server database 130. In this way, if a user attempts to use an altered passcode to operate the vehicle 102, the vehicle 102 may accept the passcode. Furthermore, if a user attempts to use a cleared key or previous passcode to operate the vehicle 102, the vehicle 102 may reject the key.

Figure 4:
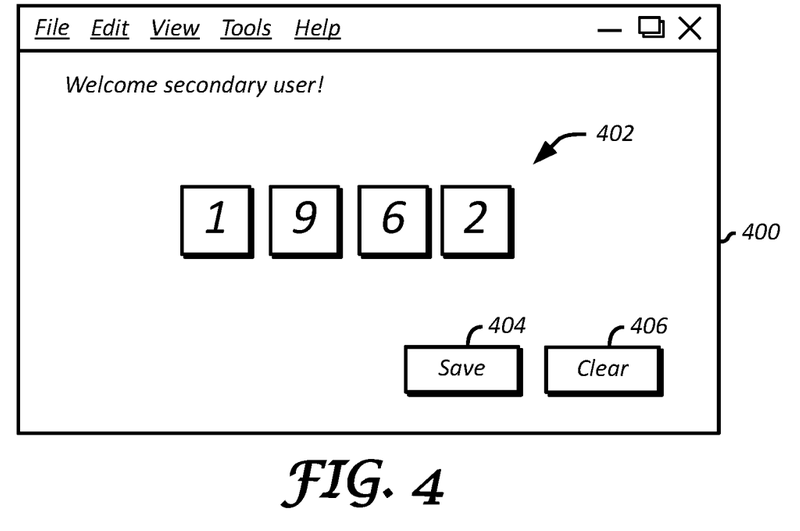
FIG. 4 is a screen from an exemplary graphical user interface (GUI) for altering a passcode key type that may be provided by the system of FIG. 1.

FIG. 4 illustrates a screen 400 of a GUI that may be provided to a user to clear or alter a received key. As shown in the illustrated embodiment, the screen 400 may include a passcode display element 402 that provides the current passcode of a received key, namely "1-9-6-2". A user may interact with the passcode display element and input a new passcode. The screen 400 may also include a save object 404 and a clear object 406. Interaction with the save object 404 may cause an updated passcode entered into the passcode display element 402 to be stored in the key database 126 and/or the server database 130 (e.g., block 314) as an operable key. Interaction with the clear object 406 may cause the received key to be deleted from the key database 126 and/or the server database 130.

Referring again to FIG. 3, responsive to identifying that a received key has administrative status ("Admin" branch of block 308), then comprehensive management rights may be enabled for the user. In particular, the key manager 124 or the key service 128 may cause a GUI to be provided to a user, such as via the display 121 of the vehicle 102 or a display of the user device 106, that enables the user to comprehensively manage keys for operating the vehicle 102. For example, in block 316, the creation of new keys having both the administrative status and the secondary status may be enabled for the user. In other words, any administrative key registered with the vehicle 102 may enable the creation of new administrative keys and new secondary keys for the vehicle 102. In block 318, updating existing keys may be enabled, which may include changing key value data (e.g., a particular biometric, a particular passcode), and/or changing vehicle features associated with existing keys. In block 320, deletion of one or more keys, or more particularly one or more secondary keys, may be enabled.

When the keys are being managed via the key manager 124, the key manager 124 may save all new keys and updates to existing keys in the key database 126, and may transmit the new keys and updates to the access server 104 over the network 108 for inclusion in the server database 130. Alternatively, if the keys are being managed via the key service 128, then in block 314, responsive to receiving a new key or an update to an existing key, the key service 128 may transmit the new key or the update to the vehicle 102, or more particularly, the key manager 124, over a wireless network for reflection in the key database 126. The key service 128 may also reflect the new and updated keys in the server database 130.

Figure 5A:
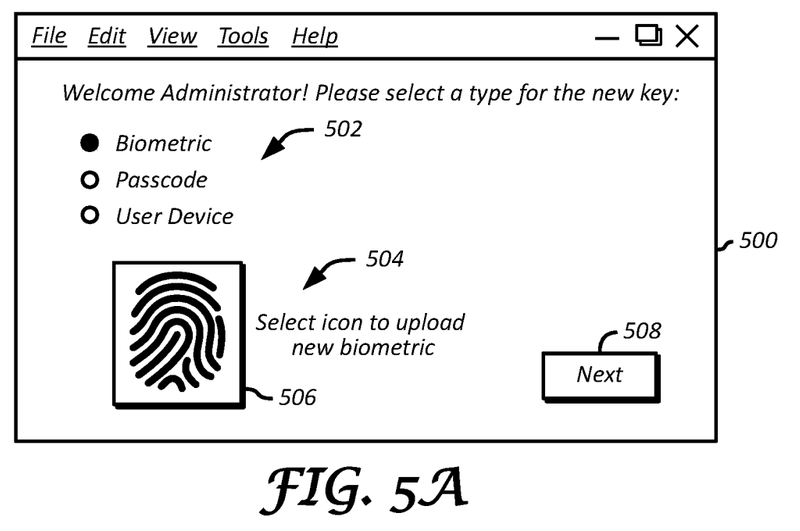
FIGS. 5A-5C are screens from an exemplary GUI for creating a new key for a vehicle that may be provided by the system of FIG. 1.
Figure 5B:
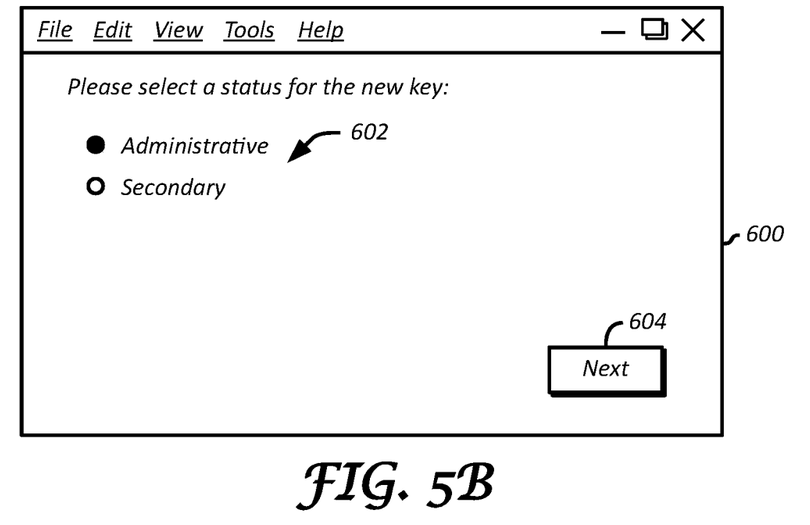
Figure 5C:
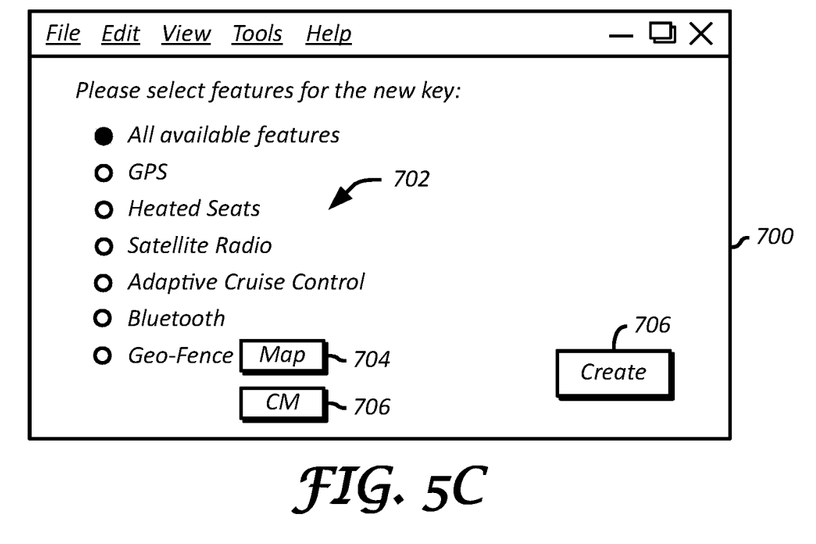

FIGS. 5A-5C illustrate screens of a GUI that may be displayed at the direction of the key manager 124 or the key service 128 for creating a new key, such as in block 316. Referring to FIG. 5A, a screen 500 may include several selectable key types 502 for a new key, namely a biometric key type, a passcode key type, and a user device key type. In the illustrated embodiment, the biometric key type is selected.

The screen 500 may also include a key definition area 504 for defining a value for the new key. The key definition area 504 may change depending on the selected key type 502. For example, when the passcode key type is selected, the key definition area 504 may display an input object that enables a user to enter an alphanumeric code. When the user device key type is selected, the key definition area 504 may display an input object for indicating a user device, such as a field for entering the phone number or token 134 of a mobile device. Alternatively, the key definition area 504 may display instructions for transmitting the token 134 to the key manager 124 or to the key service 128, or may display instructions for pairing the user device with the vehicle 102, such as via the radio transceiver controller 112C. As a further alternative, when a user accesses the key service 128 via the user device 106, the token 134 may automatically be filled in the key definition area 504, and/or may automatically be transmitted to the key service 128 when the key is created.

As shown in the illustrated embodiment, when the biometric key type is selected, a biometric object 506 may be displayed that enables a user, such as via the biometric reader 118 of the vehicle 102, or via a biometric reader of the user device 106, to upload biometric data (e.g., thumbprint). The screen 500 may further include a next object 508 that upon interaction by a user proceeds to a next screen 600 of the GUI.

Referring to FIG. 5B, the screen 600 may include status selection options 602 for the new key. In particular, the screen 600 may enable selecting an administrative status or a secondary status for the new key, whether the key be in the form of a biometric, passcode, or user device 106. In the illustrated embodiment, administrative status is selected. The screen 600 may further include a next object 604 that causes the GUI to proceed to a next screen 700.

Referring to FIG. 5C, the screen 700 may include one or more selectable options 702. Each of the selectable options 702 may relate to one or more vehicle features that may be enabled and/or disabled for the key such that, when the key is utilized to operate the vehicle 102, only the vehicle features enabled for the key are actually enabled. As some non-limiting examples, the selectable options 702 may include an option enabling or disabling the use of all optional vehicle features, an option enabling or disabling the use of GPS, an option enabling or disabling the use of heated seats, an option enabling or disabling satellite radio, an option enabling or disabling adaptive cruise control, and an option enabling or disabling the use of Bluetooth. A user may select some or all options to be enabled (or disabled) when the vehicle is operated via the new key. The selectable options 702 may also include setting up a geo-fence, which may limit operation of the vehicle 102 to certain geographical limits. The geo-fence option may include a map object 704, which when interacted with by a user causes the GUI to display a map for setting the boundaries of the geo-fence. The screen 700 may also include a counter measures object 705 that, upon interaction by a user, enables the user to set counter measures if the vehicle 102 is operated via the key outside of geo-fence boundaries (e.g., alert the driver via the user device 106 or the display 121, prevent further operation of the vehicle 102, notify an owner of the vehicle 102). The screen 700 may further include a create object 706 that, upon interaction by a user, finishes creating the new key and stores the new key in the key database 126 and/or server database 130.

Rather than customizing vehicle features for each key separately, the GUI generated by the key service 128 or the key manager 124 may enable customizing vehicle features for different privilege levels and/or profiles. In some embodiments, each of the different privilege levels may relate to a different subscription level for a ride sharing service, and/or each profile may relate to a different user or subscriber of the ride sharing service. In these cases, when a new key is created, the GUI may enable a user to select one of the different privilege levels for the key, or may select one of the difference profiles for the key. This privilege/profile system may ease the creation of new keys, and also ease changing the vehicle features for a given group of keys by simply changing the settings of a privilege level/profile instead of managing each individual key.

Figure 6:
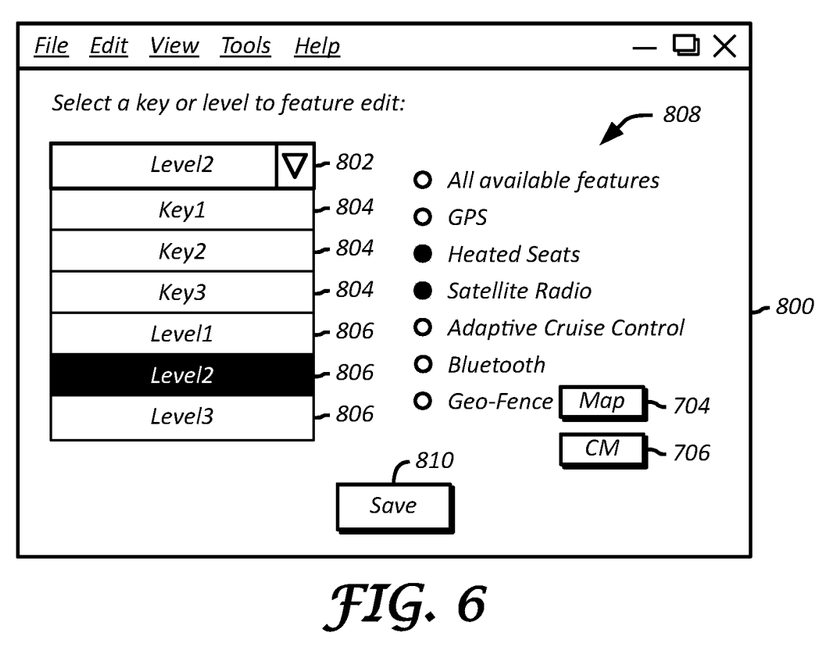
FIG. 6 is a screen from an exemplary GUI for revising vehicle features enabled for one or more keys for operating a vehicle that may be provided by the system of FIG. 1.

FIG. 6 illustrates a screen 800 of a GUI that may be displayed at the direction of the key manager 124 or the key service 128, such as in block 318 of the process 300. The screen 800 may include functionality that enables a user to edit vehicle features associated with a particular key in the key database 126 and server database 130, and may include functionality that enables a user to edit vehicle features for a privilege level that is associated with one or more keys in the key database 126 and server database 130.

The screen 800 may include a drop down box 802 for selecting a key 804 or a privilege level 806. Responsive to selecting a key 804 or a privilege level 806, a vehicle options area 808 of the screen 800 may display the vehicle options enabled for that key 804 or privilege level 806. In the illustrated embodiment, responsive to a privilege level 806 entitled "Level2" being selected, the vehicle options area 808 indicates that "Heated Seats" and "Satellite Radio" are enabled the selected privilege level 806. A user may interact with the vehicle options area 808 to select and enable additional vehicle features for the selected key 804 or privilege level 806, and to deselect and disable vehicle features for the selected key 804 or privilege level 806.

The screen 800 may further include a user-interactive save object 810 for saving vehicle feature updates made to a key 804 or privilege level 806 via the screen 800, such as in the key database 126 and the server database 130. When an update that enables a new vehicle feature for a key 804 or privilege level 806, or an update that disables an existing (i.e., previously enabled) vehicle feature for a key 804 or privilege level 806, via the screen 800 is performed utilizing the key service 128, then responsive to a user interaction with the save object 810, the key service 128 may save the update in the server database 130, and may transmit the update to the vehicle 102 over a wireless network for reflection in the key database 126. When the update is made via the key manager 124, then responsive to a user interaction with the save object 810, the key manager 124 may save the update in the key database 126, and may transmit the update to the access server 104 over a wireless network for reflection in the server database 130.

Figure 7:
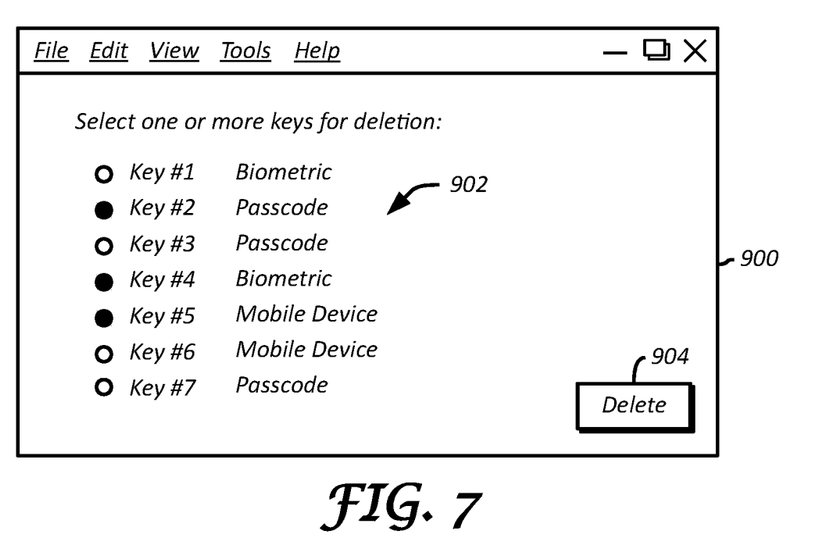
FIG. 7 is a screen from an exemplary GUI for deleting one or more vehicle keys for operating a vehicle that may be provided by the system of FIG. 1.

FIG. 7 illustrates a screen 900 of a GUI for deleting one or more keys from the key database 126 and the server database 130. The key manager 124 or the key service 128 may cause the screen 900 to be displayed in block 320 of the process 300. As shown in the illustrated embodiment, the screen 900 may include a list of keys 902 and a user-interactive delete object 904. In some embodiments, the list of keys 902 may only include keys having a secondary status. The screen 900 may enable a selection of one or several keys in the list of keys 902. After selecting one or more of the keys, a user may interact with the delete object 904 to delete the selected keys. In this way, the screen 900 enables a user to delete multiple selected keys, or multiple selected secondary keys, via a single user input on a GUI. The GUI may also enable a user to delete all keys associated with a given privilege level and/or profile.

Referring again to FIG. 3, rather than receiving a key, in block 322, an administrative login that does not function to operate the vehicle 102 may be received. In particular, a user may desire to manage keys associated with the vehicle 102 when an administrative key is lost or otherwise unavailable. Accordingly, a user may submit an administrative login to the key manager 124, such as via the HMI 116 of the vehicle 102, or to the key service 128, such a via the app 132 of the user device 106. Responsive to receiving the login that does not function operate the vehicle 102, the key manager 124 or the key service 128 may proceed with one or more of blocks 316, 318 and 320 of the process 300.

Figure 8:
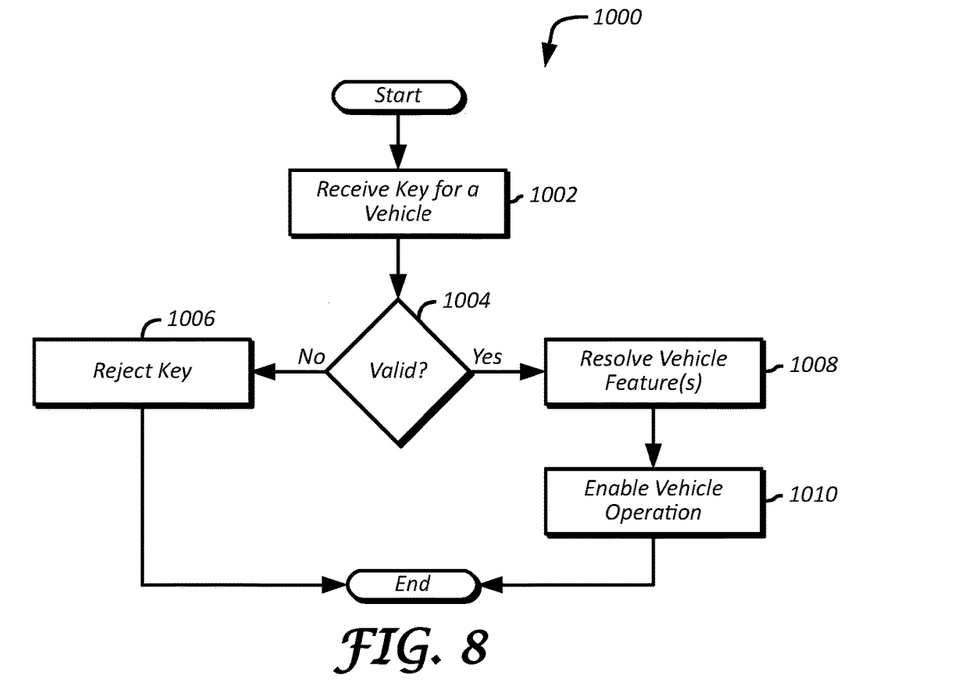
FIG. 8 is a flowchart of an exemplary process for processing a key received by a vehicle that may be performed by the system of FIG. 1.

FIG. 8 illustrates a process 1000 for enabling operation of the vehicle 102 responsive to receiving a key. The process 1000 may be implemented by the access controller 110 of the system 100.

In block 1102, a key may be received, such as by the access control module 122. In particular, the access control module 122 may receive a biometric type key via the biometric reader 118, a passcode type key via the keypad 120, or a user device type key via a local area connection 133 between the vehicle 102 and the user device 106. Alternatively, the access control module 122 may receive a biometric type key or a passcode type key from the user device 106 via the local area connection 133 between the vehicle 102 and the user device 106.

Responsive to receiving the key, in block 1104, a determination of whether the key is valid for the vehicle 102. Specifically, the key database 126 may include several records, each of the records including a key that is registered to operate the vehicle 102. The access control module 122 may therefore query the key database 126 to determine whether the key is registered.

Responsive to determining that the key is invalid ("No" branch of block 1104), in block 1106, the key may be rejected. In particular, the access control module 122 may cause the HMI 116 or the user device 106 to indicate that the key has been rejected. Responsive to determining that the key is valid ("Yes" branch of block 1104), in block 1108, one or more vehicle features enabled and/or disabled for the key may be resolved. Specifically, the key database 126 may include several records, where each record includes a key and associated therewith one or more vehicle features enabled and/or disabled for the key. In some embodiments, the enabled and/or disabled vehicle features for each key may be included in the record for the key.

Additionally, or alternatively, each key may be associated with one of a plurality of privilege levels, where each privilege level is associated with a different set of enabled and/or disabled features, such as in the key database 126 and the server database 130. In an example, each of the keys in the key database 126 may be for a subscriber to a ride sharing service, and each privilege level may be one of a set of available subscription levels having different costs. Additionally, or alternatively, each key may be associated with a user profile, where the user profile is associated with enabled and/or disabled vehicle features, such as in the key database 126 and the server database 130.

In block 1110, the access control module 122 may enable operation of the vehicle 102 such that the enabled vehicle features for the key are active and/or the disabled vehicle features for the key are disabled.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "comprised of," or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system comprising,
   a processor configured to,
      responsive to identifying a received first key for operating a vehicle as having an administrative status, enable creation of a second key for operating the vehicle having the administrative status, and creation of a third key having a secondary status and including a passcode for operating the vehicle, and
      responsive to receiving and identifying the third key as having the secondary status, enable alteration of the passcode.

2. The system of claim 1, further comprising,
   a database including a plurality of fourth keys for operating the vehicle each having the secondary status, wherein the fourth keys include a first set of keys and a second set of keys, the first set of keys includes the third key and is associated with a first privilege level within the database, the second set of keys is associated with a second privilege level within the database, and the second privilege level enables a vehicle feature that is disabled for the first privilege level, and
   a vehicle configured to, responsive to receiving and identifying the third key as associated with the first privilege level within the database, disable the vehicle feature.

3. The system of claim 2, wherein the processor is further configured to,
   responsive to receiving an administrative login that does not operate the vehicle,
      enable selection of a plurality of the fourth keys via a graphical user interface, and
      delete the selected fourth keys via a single user input on the graphical user interface.

4. The system of claim 2, wherein the processor is geographically remote from the vehicle.

5. The system of claim 2, wherein each of the fourth keys is associated within the database with a subscriber to a ride sharing service, the first privilege level comprises a first subscription level for the ride sharing service, and the second privilege level comprises a second subscription level for the ride sharing service that is costlier than the first subscription level.

6. The system of claim 5, wherein the processor is further configured to,
   responsive to receiving an update that enables a new vehicle feature for the first subscription level or that disables an existing vehicle feature for the first subscription level, transmit the update to the vehicle over a wireless network.

7. The system of claim 2, wherein the vehicle comprises the database, and the processor is further configured to, responsive to receiving a new key or an update to one of the fourth keys, transmit the new key or the update to the vehicle over a wireless network.

8. The system of claim 1, wherein the processor is further configured to, responsive to receiving the first key,
   enable, via a user interface, uploading of a biometric, and
   enable, via the user interface, selecting the biometric as the second key having the administrative status and as the third key having the secondary status.

9. A system comprising,
   a database including first and second keys for operating a vehicle, each of the first and second keys being assigned to a subscriber of a ride sharing service, and a vehicle feature being enabled for the first keys and not the second keys within the database, and
   a vehicle configured to, responsive to receiving one of the first keys, enable the vehicle feature based on the database.

10. The system of claim 9, wherein the vehicle is further configured to, responsive to receiving one of the second keys, disable the vehicle feature.

11. The system of claim 9, wherein the vehicle feature being enabled for the first keys and not the second keys within the database comprises the first keys being associated with a first subscription level for the ride sharing service within the database, and the second keys being associated with a second subscription level for the ride sharing service within the database that is less costly than the first subscription level.

12. The system of claim 11, further comprising a processor remote from the vehicle and configured to, responsive to receiving an update that enables a new vehicle feature for the first subscription level or that disables an existing vehicle feature for the first subscription level, transmit the update to the vehicle over a wireless network.

13. The system of claim 11, wherein the vehicle comprises the database, and the system further comprises a processor remote form the vehicle and configured to, responsive to receiving a new key or an update to one of first or second keys, transmit the new key or the update to the vehicle over a wireless network.

14. The system of claim 11, further comprising a processor geographically remote from the vehicle and configured to, responsive to receiving an administrative login that does not operate the vehicle, enable selection of a plurality of the first keys and the second keys via graphical user interface, and delete the selected keys via a single user input on the graphical user interface.

15. A method comprising, by a processor, responsive to identifying a received first key for operating a vehicle as having an administrative status, displaying a GUI that enables user creation of a second key for operating the vehicle having the administrative status and of a third key for operating the vehicle having a secondary status and a passcode, and responsive to receiving and identifying the third key as having the secondary status, enabling alteration of the passcode.

16. The method of claim 15, further comprising, responsive to identifying the received first key for operating the vehicle as having the administrative status, enabling selection, from a database including a plurality of fourth keys for operating the vehicle that includes the third key and that each has the secondary status, a plurality of the fourth keys via a graphical user interface (GUI), and responsive to a single user input on the GUI, deleting the selected fourth keys.

17. The method of claim 15, further comprising, by a vehicle, storing a database including a plurality of fourth keys for operating the vehicle each having the secondary status, wherein the fourth keys include a first set of keys and a second set of keys, the first set of keys includes the third key and is associated with a first subscription level for a ride sharing service within the database, the second set of keys is associated with a second subscription level for the ride sharing service within the database that is costlier than the first subscription level, and the second subscription level enables a vehicle feature that is disabled for the first subscription level, and responsive to receiving and identifying the third key as associated with the first subscription level within the database, disable the vehicle feature.

18. The method of claim 17, further comprising, by the processor, responsive to receiving an update that enables a new vehicle feature or disables an existing vehicle feature for the first subscription level, transmitting the update to the vehicle over a wireless network.

19. The method of claim 17, further comprising, by the processor, responsive to receiving a new key or an update to one of the fourth keys, transmitting the new key or the update to the vehicle over a wireless network.

20. The method of claim 15, further comprising, responsive to receiving the first key, enabling, via a graphical user interface (GUI), uploading of a biometric, and enabling, via the GUI, selecting the biometric as the second key having the administrative status and as the third key having the secondary status.

* * * * *